United States Patent

Steffens, Jr. et al.

[11] Patent Number: 5,439,248
[45] Date of Patent: Aug. 8, 1995

[54] VEHICLE OCCUPANT RESTRAINT APPARATUS

[75] Inventors: Charles E. Steffens, Jr., Washington; Louis R. Brown, Oxford, both of Mich.

[73] Assignee: TRW Vehicle Safety Systems Inc., Lyndhurst, Ohio

[21] Appl. No.: 170,700

[22] Filed: Dec. 21, 1993

[51] Int. Cl.$^6$ .............................................. B60R 21/22
[52] U.S. Cl. ................................ 280/730.2; 280/728.2
[58] Field of Search .......... 280/728 B, 730 A, 730 R, 280/728 R, 729, 743 R, 728 A

[56] References Cited

U.S. PATENT DOCUMENTS

| | | | |
|---|---|---|---|
| 3,767,229 | 10/1973 | Cain | 280/732 |
| 3,843,150 | 10/1974 | Harada et al. | 280/729 |
| 4,966,388 | 10/1990 | Warner et al. | 280/730 A |
| 5,072,966 | 12/1991 | Nishitake et al. | 280/730 |
| 5,242,191 | 9/1993 | Faigle et al. | 280/732 |
| 5,308,112 | 5/1994 | Hill et al. | 280/728 R |
| 5,340,151 | 8/1994 | Sato | 280/730 A |

FOREIGN PATENT DOCUMENTS

| | | | |
|---|---|---|---|
| 2249740 | 10/1990 | Japan | 280/730 A |
| 3276844 | 12/1991 | Japan | 280/730 A |

Primary Examiner—Margaret A. Focarino
Assistant Examiner—Paul N. Dickson
Attorney, Agent, or Firm—Tarolli, Sundheim & Covell

[57] ABSTRACT

A vehicle occupant restraint apparatus (10) includes an inflatable vehicle occupant restraint (12) supported on the vehicle door (16). The door (16) has a detachable inner trim panel section (32) with an outer side surface (42) that partly defines the occupant compartment (20). The apparatus further includes a source of inflation fluid (14) and a manifold (52) for directing inflation fluid from the source (14) into the restraint (12) to inflate the restraint (12). The detachable inner trim panel section (32) of the door (16) is a panel portion of the restraint (12) which moves into the occupant compartment (20) upon inflation of the restraint (12), and has an inner side surface (40) for contacting the inflation fluid directed into the restraint (12). The inner side surface (40) of the panel portion of the restraint (12) partly defines the volume enclosed within the restraint (12) when the restraint (12) is inflated.

7 Claims, 4 Drawing Sheets

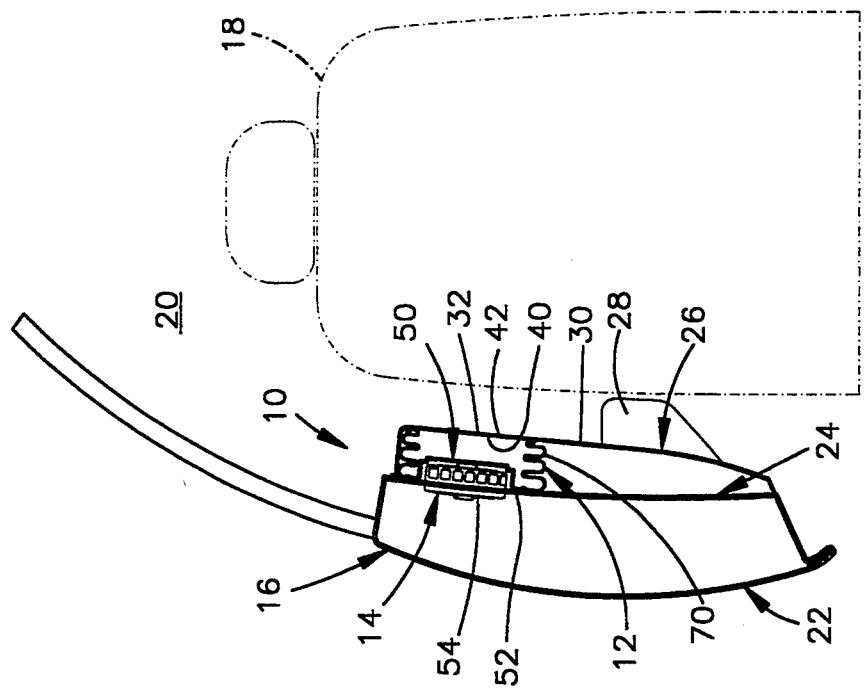
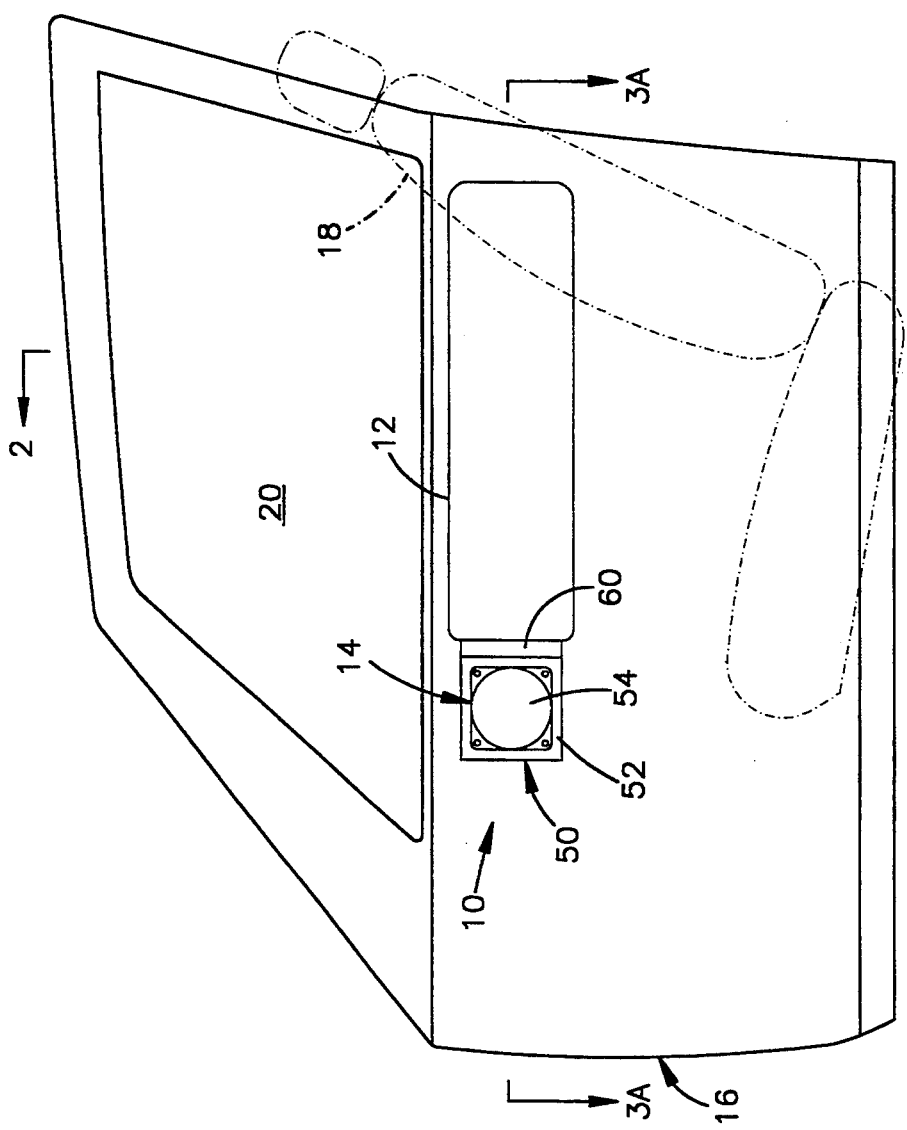
Fig.1
Fig.2

VEHICLE OCCUPANT RESTRAINT APPARATUS

FIELD OF THE INVENTION

The present invention relates to an inflatable vehicle occupant restraint, and particularly relates to an inflatable vehicle occupant restraint which is inflated upon the occurrence of a side impact collision.

BACKGROUND OF THE INVENTION

An inflatable vehicle occupant restraint, such as an air bag, is inflated when the vehicle experiences a collision. Inflation fluid is then directed to flow from a source of inflation fluid into the restraint to inflate the restraint. The inflation fluid expands the restraint from a stored condition to an inflated condition in which the restraint extends into the vehicle occupant compartment. When the restraint is thus inflated into the occupant compartment, it restrains an occupant from forcefully striking parts of the vehicle.

Such an inflatable vehicle occupant restraint is concealed from the occupant compartment when it is stored. A deployment door typically extends over the restraint to conceal the restraint from the occupant compartment. The force of the inflation fluid flowing into the restraint is directed against the deployment door to open and move the deployment door out of the path of the restraint when the restraint is inflated and moved into the occupant compartment. The deployment door is normally formed as a portion of the vehicle part in which the restraint is stored. In certain applications, the deployment door may be formed as a portion of the steering wheel, instrument panel, or vehicle door, depending upon the location of the restraint in the vehicle. If the restraint is to be inflated upon the occurrence of a side impact collision, the restraint and the deployment door will often be located on a vehicle door.

SUMMARY OF THE INVENTION

In accordance with the present invention, an apparatus for restraining an occupant of a vehicle comprises a vehicle part and an inflatable vehicle occupant restraint supported on the vehicle part. The vehicle part has a detachable panel section with an outer side surface means for partly defining the occupant compartment. The restraint is inflatable into an inflated condition in which it extends into the occupant compartment. The apparatus further includes a source of inflation fluid and a means for directing inflation fluid from the source of inflation fluid into the restraint to inflate the restraint.

The detachable panel section of the vehicle part comprises a panel portion of the restraint which moves into the occupant compartment upon inflation of the restraint. The detachable panel section of the vehicle part, i.e., the panel portion of the restraint, has an inner side surface means for contacting the inflation fluid directed into the restraint. The detachable panel section of the vehicle part thus partly defines the volume enclosed within the restraint when the restraint is in the inflated condition.

In a preferred embodiment of the present invention, the vehicle part supporting the restraint is a vehicle door, and the panel portion of the restraint is defined by a detachable section of an inner trim panel on the door. The restraint further has a stored air bag portion. The air bag portion of the restraint moves into a condition extending from the door upon inflation of the restraint. The panel portion of the restraint is fixed to the air bag portion, and moves from the door with the air bag portion upon inflation of the restraint. Since the panel portion of the restraint is defined by a detachable section of the inner trim panel on the door, it partly defines the occupant compartment at the door. The panel portion of the restraint thus functions as a deployment door which conceals the air bag portion from the occupant compartment, and also as a portion of the restraint which moves into the occupant compartment to restrain an occupant of the vehicle.

BRIEF DESCRIPTION OF THE DRAWINGS

Further features of the present invention will become apparent to those skilled in the art to which the present invention relates from reading the following description with reference to the accompanying drawings, in which:

FIG. 1 is a schematic view of a vehicle door, a vehicle seat adjacent to the door, and a vehicle occupant restraint apparatus comprising a first embodiment of the present invention;

FIG. 2 is a view taken on line 2—2 of FIG. 1;

DESCRIPTION OF PREFERRED EMBODIMENTS

Figure 3A:
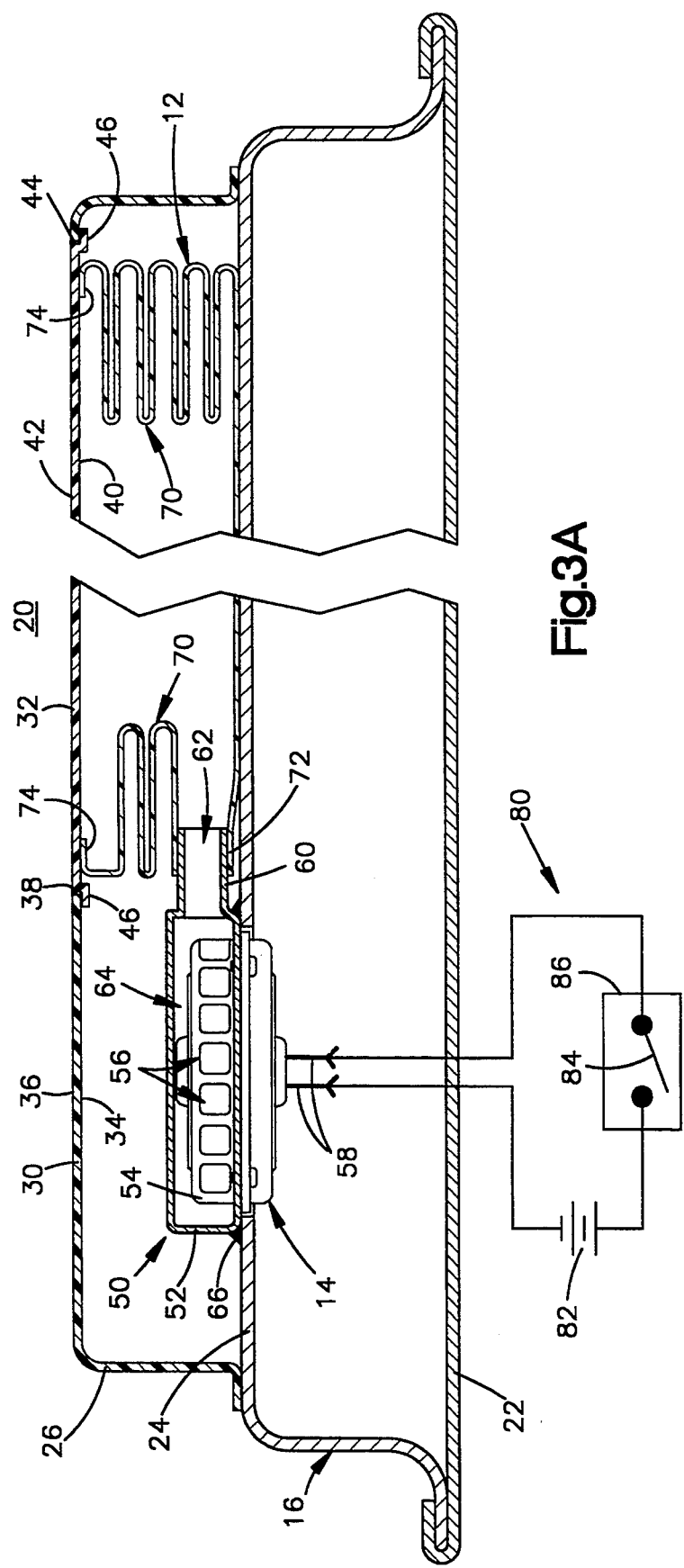
FIG. 3A is a view taken on line 3A—3A of FIG. 1.

A vehicle occupant restraint apparatus 10 comprising a first embodiment of the present invention is shown schematically in FIG. 1. The apparatus 10 includes an inflatable vehicle occupant restraint 12 and an inflator 14. The restraint 12 and the inflator 14 are mounted on a vehicle door 16 in a position adjacent to a seat 18 in the vehicle occupant compartment 20. When the vehicle experiences an impact against the vehicle indicative of a collision, the inflator 14 is actuated. The inflator 14 then emits a large volume of inflation fluid which is directed into the restraint 12 to inflate the restraint 12. As the restraint 12 inflates, it moves outward from the door 16 and into the occupant compartment 20 adjacent to the seat 18. When the restraint 12 is thus inflated into the occupant compartment 20, it restrains an occupant of the seat 18 to protect the occupant from a forceful impact with the door 16.

As shown in FIGS. 2 and 3A, the door 16 has an outer structural panel 22 and an inner structural panel 24. The door 16 further includes an inner trim panel 26 between the inner structural panel 24 and the occupant compartment 20.

The trim panel 26 includes an armrest structure 28. The trim panel 26 further has a major section 30 from which the armrest structure 28 projects and a detachable section 32 above the armrest structure 28. As shown in FIG. 3A, the major section 30 of the trim panel 26 has a side surface 34 which faces toward the inner structural panel 24, and has an opposite side surface 36 which faces toward the occupant compartment 20. The side surface 36 facing toward the occupant compartment 20 partly defines the boundary of the occupant compartment 20 at the door 16. An edge surface 38 of the major section 30 of the trim panel 26 defines an opening extending through the major section 30.

Figure 3B:
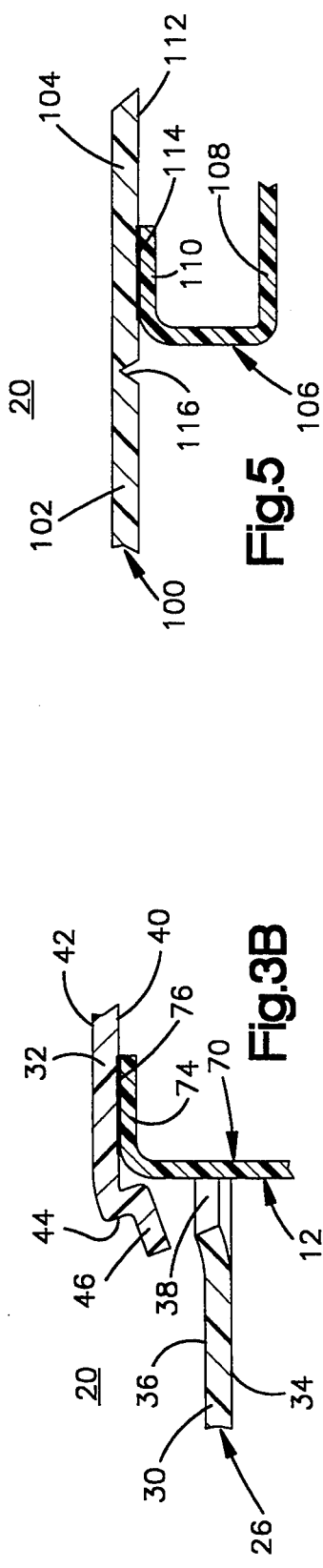
FIG. 3B is an enlarged partial view of the apparatus of FIG. 3A, showing parts in partially actuated positions.

The detachable section 32 of the trim panel 26 also has a side surface 40 facing the inner structural panel 24 and a side surface 42 partly defining the boundary of the occupant compartment 20 at the door 16. An edge surface 44 of the detachable section 32 adjoins the edge surface 38 of the major section 30. The detachable section 32 further has a peripheral retainer portion 46 which overlies the inner side surface 34 of the major section 30 adjacent to the edge surface 38. The detachable section 32 thus extends entirely across, and closes, the opening defined by the edge surface 38. As indicated in FIG. 3B, the material of the trim panel 26 is deformable sufficiently to enable the retainer portion 46 to move around and past the edge surface 38 for detachment of the detachable section 32 from the major section 30. However, the retainer portion 46 holds the detachable section 32 securely in place, as shown in FIG. 3A, until the inflator 14 is actuated.

The inflator 14 is part of an inflator module 50 which includes the inflator 14 and a manifold 52. The inflator 14 has a short, cylindrical housing 54 with a plurality of gas outlet openings 56. The housing 54 contains an ignitable gas generating material which, when ignited, rapidly produces gas for inflating the restraint 12. The gas generating material may have any suitable composition known in the art, and is ignited in a known manner upon the passage of electric current between a pair of lead wires 58. Although the preferred embodiments of the invention shown in the drawings use the inflator 14 to provide gas for inflating the restraint 12, other known sources of inflation fluid could be used as alternatives.

The manifold 52 surrounds, but is spaced from, the gas outlet openings 56 in the housing 54, and has an open end portion 60 defining a gas exit opening 62. The manifold 52 thus defines a gas flow space 64 which communicates the gas outlet openings 56 in the housing 54 with the gas exit opening 62 in the manifold 52. The module 50 is fixed to the inner structural panel 24 of the door 16 by any suitable fastening structure, such as by a weld 66, with the gas exit opening 62 being located in the space between the inner structural panel 24 and the trim panel 26.

The restraint 12 has a portion which is defined by an air bag 70. The air bag 70 is stored in the space between the inner structural panel 24 and the trim panel 26. A first open end 72 of the air bag 70 is received over the open end portion 60 of the manifold 52, and is fixed to the manifold 52 by any suitable means (not shown). A second open end 74 of the air bag 70 is fixed to the detachable section 32 of the trim panel 26 by an adhesive 76 (FIG. 3B) or an ultrasonic weld. The detachable section 32 of the trim panel 26 thus defines a panel portion of the restraint 12 which is fixed to the air bag 70. In the first preferred embodiment of the invention, the inner side surface 40 of the detachable section 32 extends across the second open end 74 of the air bag 70.

As shown schematically in FIG. 3A, the vehicle occupant restraint apparatus 10 further includes an electrical circuit 80. The electrical circuit 80 includes a power source 82, which is preferably the vehicle battery or a capacitor, and a normally open switch 84. The switch 84 is part of a sensor 86 which senses the occurrence of a vehicle collision, such as a side impact collision in which the side of the vehicle is impacted by an object, such as another vehicle. The sensor 86 closes the switch 84 upon sensing the occurrence of such a side impact collision. Such a sensor is known in the art. When the switch 84 is closed, the electrical circuit 80 directs electric current between the lead wires 58 to actuate the inflator 14 by causing the gas generating material in the inflator 14 to ignite.

When the inflator 14 is actuated, the gas emitted from the inflator 14 flows through the gas flow space 64 to the gas exit opening 62 and into the restraint 12 through the first open end 72 of the air bag 70. The gas rushes through the air bag 70 to the detachable section 32 of the trim panel 26, and quickly reaches an elevated pressure within the restraint 12.

Figure 4:
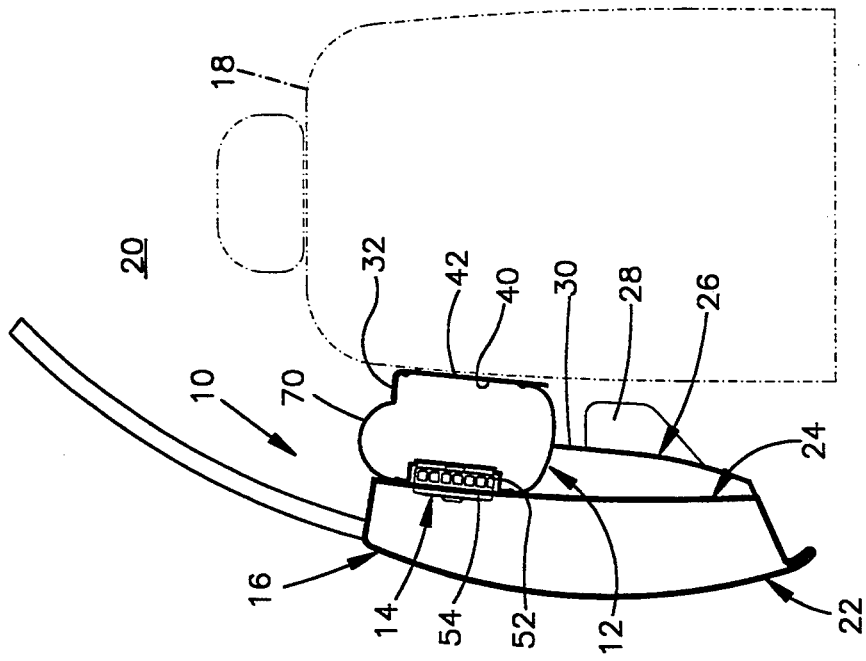
FIG. 4 is a view similar to FIG. 2 showing the vehicle occupant restraint apparatus in a fully actuated condition.

The pressure of the gas acting outward against the inner side surface 40 of the detachable section 32 of the trim panel 26 causes the detachable section 32 to detach from the major section 30, as shown partially in FIG. 3B. As the gas continues to flow into the restraint 12, the air bag 70 inflates from the stored condition of FIG. 3A, and moves into the occupant compartment 20 with the detachable section 32 until the restraint 12 reaches the inflated condition shown in FIG. 4. The portion of the major section 30 which is located to right of the detachable section 32, as viewed in FIG. 3A, is sufficiently flexible to be pushed out of the path of movement of the air bag 70 by the air bag 70. That portion of the major section 30 thus enables the air bag 70 to move into the space between an adjacent B-pillar and the seat 18. The major section 30 could further include other flexible portions about the periphery of the detachable section 32, as needed, depending upon the particular trim panel 26 with which the present invention is used. The restraint 12 is thus inflated into the occupant compartment 20 to restrain and protect an occupant of the seat 18 from a forceful impact with the door 16. Since the inner side surface 40 of the detachable section 32 extends across the second open end 74 of the air bag 70, the volume enclosed within the inflated restraint 12 is defined in part by the area of the inner side surface 40 which extends across the second open end 74 of the air bag 70.

Figure 5:
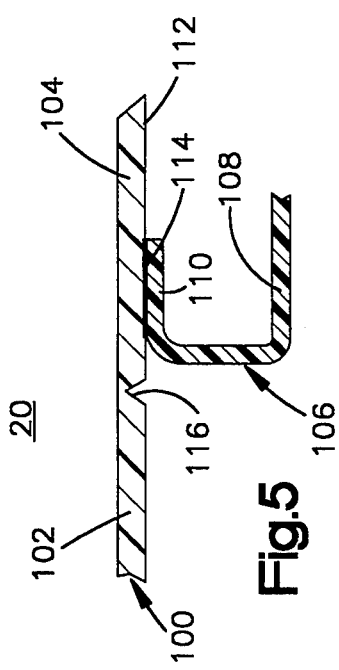
FIG. 5 is a view of parts of a vehicle occupant restraint apparatus comprising a second embodiment of the present invention.

In the first embodiment of the present invention described above, the major section 30 and the detachable section 32 of the trim panel 26 abut each other as separate parts of the trim panel 26. As shown partially in FIG. 5, a second embodiment of the present invention includes an alternative trim panel 100 in place of the trim panel 26. The material of the trim panel 100 is continuous throughout a major section 102 and a detachable section 104 of the trim panel 100. The major section 102 and the detachable section 104 are thus joined to each other as connected parts of the trim panel 100.

Other parts of the second embodiment of the invention are substantially the same as corresponding parts of the first embodiment described above. The second embodiment thus includes an inflatable vehicle occupant restraint 106 which includes both an air bag 108 and the detachable section 104 of the trim panel 100. The air bag 108 has an open end 110 which is fixed to an inner side surface 112 of the detachable section 104 by an adhesive 114. The pressure of the gas directed into the restraint 106 acts outward against the inner side surface 112 when the restraint 106 is being inflated. The volume enclosed within the inflated restraint 106 is thus defined in part by the area of the inner side surface 112 which extends across the open end 110 of the air bag 108.

The trim panel 100 further has an indented surface portion 116 which extends around the entire periphery of the detachable section 104. The indented surface portion 116 forms a notch which defines a stress riser in the material of the trim panel 100 that interconnects the detachable section 104 with the major section 102. When the gas pressure acting outward against the inner side surface 112 reaches a predetermined elevated level, it ruptures the material of the trim panel 100 which comprises the stress riser. The detachable section 104 and the air bag 108 are thus released for movement into the occupant compartment 20 by the pressure of the gas directed into the restraint 106.

As an additional alternative in the design of the vehicle occupant restraint apparatus 10, a releasable adhesive or other releasable fastening structure could be used with, or in place of, the retainer portion 46 of the detachable section 32 of the trim panel 26 in the first embodiment of the invention. Moreover, a score line, breakable tabs or the like could be used in place of the indented surface portion 116 of the trim panel 100 in the second embodiment. In each case, however, the panel portion of the restraint would be securely held in place on the respective door 16 until the respective inflator 14 is actuated.

Figure 6:
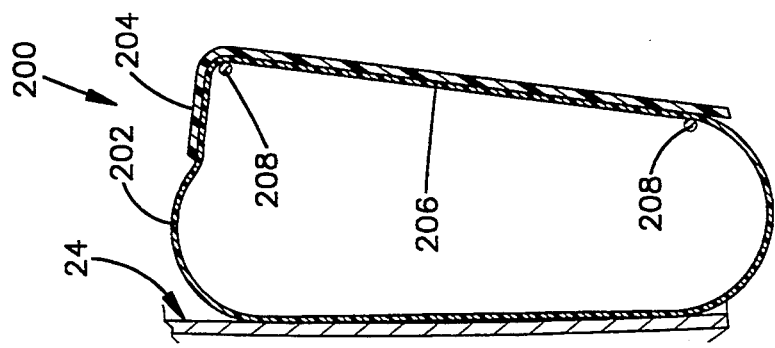
FIG. 6 is a view of parts of a vehicle occupant restraint apparatus comprising a third embodiment of the present invention, showing the parts in fully actuated positions.

In a third embodiment of the present invention, the apparatus 10 includes an inflatable vehicle occupant restraint 200, which is shown partially in FIG. 6. The restraint 200 has an air bag portion 202 and a panel portion 204. The panel portion 204 of the restraint 200 is substantially the same as either of the alternative panel portions of the restraints described above. The air bag portion 202 of the restraint 200 differs from the air bag portions of the restraints described above in that the air bag portion 202 does not have an open end fixed to the panel portion 204. Instead, the air bag portion 202 extends continuously over an inner side surface 206 of the panel portion 204, as shown in FIG. 6. A pair of mounting rods 208 with suitable fasteners (not shown) hold the air bag portion 202 in place against the inner side surface 206. The volume enclosed within the inflated restraint 200 is thus defined entirely by the air bag portion 202.

Figure 7:
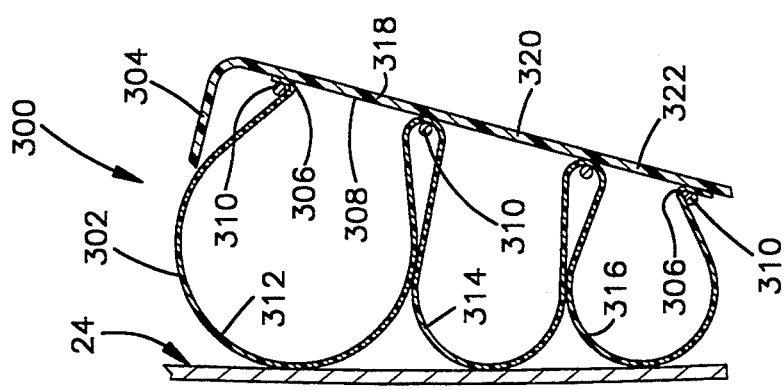
FIG. 7 is a view of parts of a vehicle occupant restraint apparatus comprising a fourth embodiment of the present invention, showing the parts in fully actuated positions.

In a fourth embodiment of the present invention, the apparatus 10 includes an inflatable vehicle occupant restraint 300, which is shown partially in FIG. 7. The restraint 300 has an air bag portion 302 and a panel portion 304. The structure of the panel portion 304 of the restraint 300 is substantially the same as the structure of any one of the alternative panel portions of the restraints described above.

The air bag portion 302 of the restraint 300 is similar to the air bag portion 70 of the restraint 12, which is shown in FIG. 3A, in that the air bag portion 302 has an open end 306 which is fixed to the panel portion 304. The volume enclosed with the inflated restraint 300 is thus defined in part by the area of an inner side surface 308 of the panel portion 304 which extends across the open end 306 of the air bag portion 302. However, the air bag portion 302 of the restraint 300 differs from the air bag portions of each of the restraints described above in that the air bag portion 302 is divided into distinct tubular sections 312, 314 and 316. Each of the tubular sections 312, 314 and 316 communicates with a common air bag portion (not shown) which, in turn, communicates with a source of inflation fluid, such as the inflator 14. Each of the tubular sections 312, 314 and 316 of the air bag portion 302 adjoins a respective section 318, 320 and 322 of the panel portion 304. A plurality of mounting rods 310 with suitable fasteners (not shown) hold the air bag portion 302 in place against the inner side surface 308. The mounting rods 310 also separate the tubular sections 312, 314 and 316 of the air bag portion 302 from each other.

When the restraint 300 is inflated as shown in FIG. 7, the inflated air bag portion 302 moves the panel portion 304 forcefully away from the inner structural panel 24. The pressure of the inflation fluid in each of the tubular sections 312, 314 and 316 of the air bag portion 302 thus applies a force against the respective adjoining section 318, 320 and 322 of the panel portion 304. The pressure of the inflation fluid in the restraint 300 can be controlled so that the pressure differs in each of the tubular sections 312, 314 and 316 of the air bag portion 302. The respective forces applied by the tubular sections 312, 314 and 316 of the air bag portion 302 to the adjoining sections 318, 320 and 322 of the panel portion 304 will differ accordingly. As a result, each of the sections 318, 320 and 322 of the panel portion 304 will contact a different part of the occupant's body with a different force as the restraint 300 is inflated. This arrangement enables the restraint 300 to contact a relatively sensitive part of the occupant's body with relatively lesser force, and to restrain the relatively sensitive part of the occupant's body with a lower fluid pressure. Likewise, the restraint 300 is able to contact a relatively stronger part of the occupant's body with a relatively greater force and to restrain the relatively stronger part of the occupant's body with a higher fluid pressure.

Figure 8:
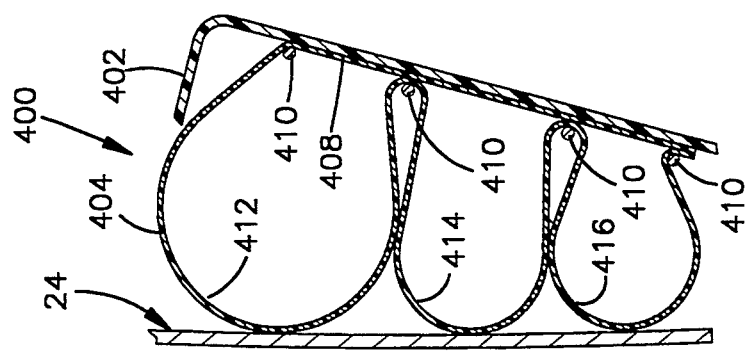
FIG. 8 is a view of parts of a vehicle occupant restraint apparatus comprising a fifth embodiment of the present invention, also showing the parts in fully actuated positions.

In a fifth embodiment of the present invention, the apparatus 10 includes an inflatable vehicle occupant restraint 400, which is shown partially in FIG. 8. As in each of the alternative embodiments of the invention described above, the restraint 400 has a panel portion 402 which is defined by a detachable section of a door trim panel like the trim panel 26 (FIG. 3A).

The restraint 400 further has an air bag portion 404. The air bag portion 404 of the restraint 400 is similar to the air bag portion 302 of the restraint 300 shown in FIG. 7. However, the air bag portion 404 differs somewhat from the air bag portion 302 in that the air bag portion 404 does not have an open end at the panel portion 402. Instead, the air bag portion 404 of the restraint 400 extends continuously over an inner side surface 408 of the panel portion 402, as shown in FIG. 8. A plurality of mounting rods 410 with suitable fasteners (not shown) hold the air bag portion 404 in place against the inner side surface 408, and also divide the air bag portion 404 into distinct tubular sections 412, 414 and 416 like the tubular sections 312, 314 and 316 of the air bag portion 302 shown in FIG. 7.

Figure 9:
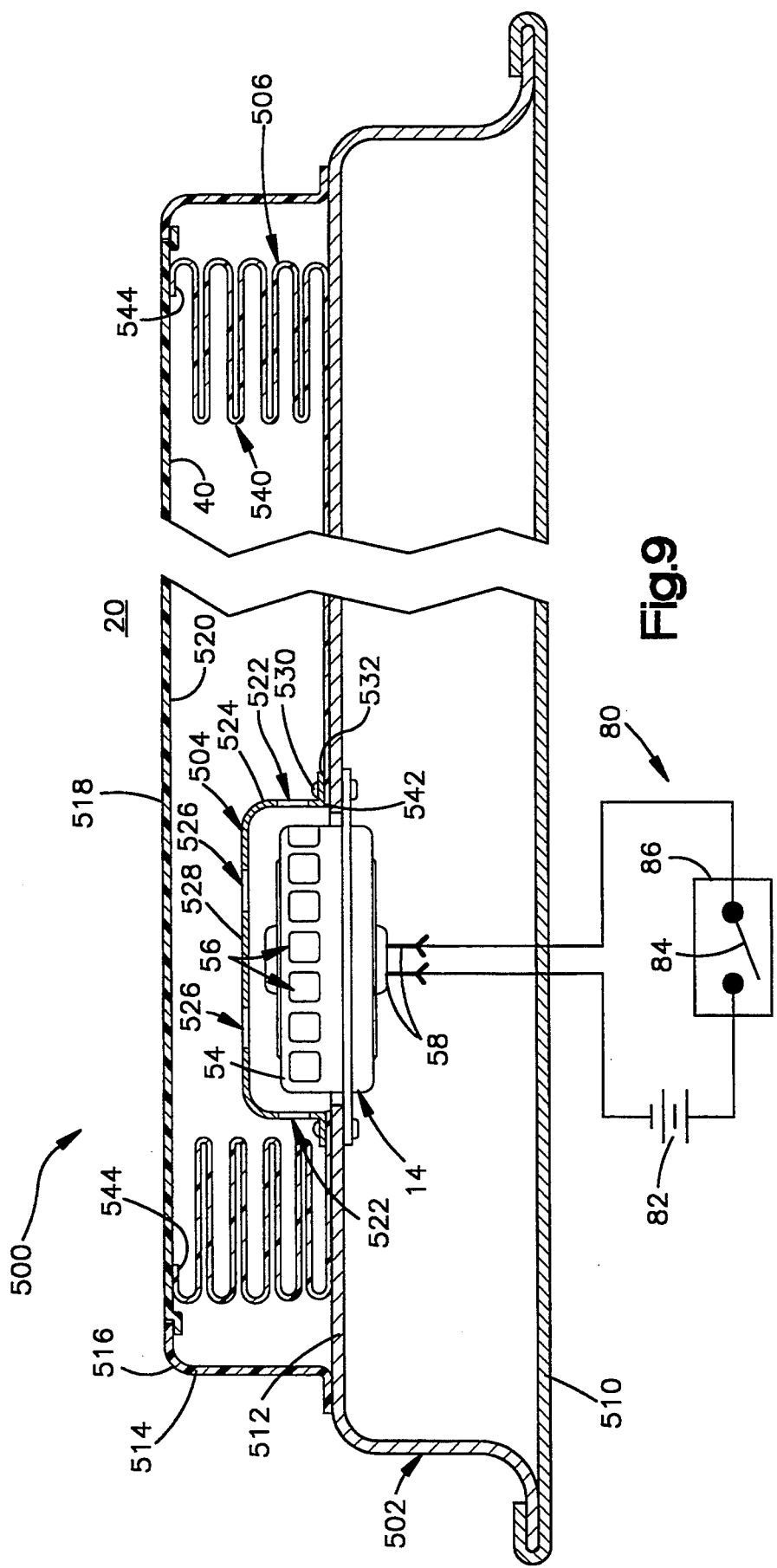
FIG. 9 is schematic view of a vehicle occupant restraint apparatus comprising a sixth embodiment of the present invention.

A vehicle occupant restraint apparatus 500 comprising a sixth embodiment of the present invention is shown schematically in FIG. 9. The apparatus 500 is associated with a vehicle door 502, and includes a manifold 504 and an inflatable vehicle occupant restraint 506 which differ somewhat from the manifold 50 and the restraint 12 in the apparatus 10 described above. Other parts of the apparatus 500, such as an inflator 14 and an electrical circuit 80, are substantially the same as corresponding parts of the apparatus 10, as indicated by the same reference numbers used in FIGS. 3A and 9.

The door 502 has an outer structural panel 510, an inner structural panel 512, and an inner trim panel 514. The trim panel 514 has a major section 516 and a detachable section 518. The detachable section 518 extends along nearly the entire length of the major section 516 between the opposite ends of the trim panel 514. The panel sections 516 and 518 are otherwise substantially the same as the panel sections 30 and 32 shown in FIG. 3A. The detachable section 518 is thus detachable from the major section 516 under the influence of inflation fluid pressure directed against an inner side surface 520 of the detachable section 518.

The manifold 504 surrounds and is spaced from the gas outlet openings 56 in the inflator housing 54. A plurality of first gas exit openings 522 extend radially through a cylindrical side wall 524 of the manifold 504. A plurality of second gas exit openings 526 extend axially through a circular outer end wall 528 of the manifold 504. The manifold 504 is secured to the inner structural panel 512 of the door 502 by a plurality of fasteners 530. The fasteners 530 extend through openings in a circular flange 532 at the inner end of the side wall 524.

The restraint 506 has a panel portion which is defined by the detachable section 518 of the trim panel 514, and further has a portion which is defined by an air bag 540. A first open end 542 of the air bag 540 surrounds the inflator 14, and is secured between the inner structural panel 512 and the flange 532 by the fasteners 530. A second open end 544 of the air bag 540 is fixed to the detachable section 518 of the trim panel 514 by an adhesive or an ultrasonic weld.

When the inflator 14 in the apparatus 500 is actuated, the gas emitted from the inflator 14 flows into the restraint 506 through the first and second gas exit openings 522 and 526 in the manifold 504. The gas rushes through the air bag 540 to the detachable section 518 of the trim panel 514 and quickly reaches an elevated pressure within the restraint 506. The pressure of the gas acting outward against the inner side surface 520 causes the detachable section 518 of the trim panel 514 to detach from the major section 516 in the same manner as described above with reference to the corresponding parts of the trim panel 26 shown in FIGS. 3A and 3B. As the gas continues to flow into the restraint 506, the air bag 540 inflates and moves into the occupant compartment 20 with the detachable section 518. The restraint 506 is thus inflated into the occupant compartment 20 to restrain and protect an occupant of the seat 18 (FIG. 1) from a forceful impact with the door 502.

The restraint apparatus 500 can have any of the alternative features described above with reference to the restraint apparatus 10. Moreover, in each of the embodiments of the invention described above, tethers are preferably included to control the size and shape of the inflated restraint. Such tethers extend across the inside of an inflatable restraint in a known manner. Also, the configuration and structure of the detachable panel section, which forms the panel portion of the restraint, can be varied for particular applications of the invention. For example, a detachable panel section can be covered by a trim layer which gives the panel portion of the restraint an appearance consistent with the trim theme of a particular vehicle.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for restraining an occupant of a vehicle occupant compartment, said apparatus comprising:

a vehicle part having a detachable panel section, said detachable panel section of said vehicle part having an outer side surface means for partly defining the occupant compartment;

an inflatable vehicle occupant restraint supported on said vehicle part, said restraint having a folded air bag portion which moves into an unfolded condition extending from said vehicle part into the occupant compartment upon inflation of said restraint;

said restraint further having a panel portion which comprises said detachable panel section of said vehicle part, said panel portion of said restraint being fixed to said air bag portion to move from said vehicle part with said air bag portion;

a source of inflation fluid; and means for directing inflation fluid from said source into said restraint to inflate said restraint;

said restraint including means for separating said air bag portion into distinct sections that adjoin respective distinct sections of said panel portion, said sections of said air bag portion separately applying respective fluid pressure forces to said respective sections of said panel portion upon inflation of said restraint;

said sections of said air bag portion having elongated tubular shapes, said means for separating said air bag portion into distinct sections comprising a plurality of mounting rods which extend longitudinally between said sections of said air bag portion.

2. Apparatus as defined in claim 1 wherein said panel portion of said restraint has an inner side surface means for contacting said inflation fluid directed into said restraint, said inner side surface means thus partly defining the volume enclosed within said restraint when said restraint is inflated.

3. Apparatus as defined in claim 1 wherein said air bag portion of said restraint defines the entire volume enclosed within said restraint when said restraint is inflated.

4. Apparatus as defined in claim 1 wherein said detachable panel section of said vehicle part is detachable entirely from said vehicle part and is moved to a location spaced from said vehicle part upon inflation of said restraint.

5. Apparatus as defined in claim 1 wherein said vehicle part is a vehicle door having an inner trim panel, said detachable panel section of said vehicle part being a detachable section of said inner trim panel.

6. Apparatus as defined in claim 1 further comprising means for sensing the occurrence of a side impact vehicle collision and means for causing inflation fluid to be emitted from said source in response to a sensed side impact vehicle collision.

7. Apparatus for restraining an occupant of a vehicle occupant compartment, said apparatus comprising:

a vehicle part having a detachable panel section, said detachable panel section of said vehicle part having an outer side surface means for partly defining the occupant compartment;

an inflatable vehicle occupant restraint supported on said vehicle part, said restraint having an air bag portion which moves into an inflated condition extending from said vehicle part into the occupant compartment upon inflation of said restraint;

said restraint further having a panel portion which comprises said detachable panel section of said vehicle part, said panel portion of said restraint being fixed to said air bag portion of said restraint to move from said vehicle part with said air bag portion of said restraint;

a source of inflation fluid;

means for directing inflation fluid from said source into said restraint to inflate said restraint; and mounting means for holding said air bag portion of said restraint against said panel portion in a configuration in which said air bag portion has sections which are separated from each other at said panel portion by said mounting means, said sections of said air bag portion adjoining respective sections of said panel portion and separately applying respective fluid pressure forces to said respective sections of said panel portion;

said sections of said air bag portion communicating in common with said source of inflation fluid to receive inflation fluid from said source upon inflation of said restraint.

* * * * *